United States Patent [19]

McCartney

[11] 4,332,710
[45] Jun. 1, 1982

[54] THERMAL COAGULATION OF POLYURETHANE DISPERSIONS

[75] Inventor: John McCartney, Chester County, Pa.

[73] Assignee: Norwood Industries, Inc., Malvern, Pa.

[21] Appl. No.: 234,464

[22] Filed: Feb. 17, 1981

[51] Int. Cl.³ ............................................... C08K 3/34
[52] U.S. Cl. ...................................... 524/591; 427/246
[58] Field of Search .................. 260/29.2 TN, 45.7 R; 427/246

[56] References Cited

U.S. PATENT DOCUMENTS

| | | | |
|---|---|---|---|
| 3,412,054 | 11/1968 | Milligan | 260/29.2 TN |
| 4,046,729 | 9/1977 | Scriven | 260/29.3 |
| 4,203,883 | 5/1980 | Hangauer | 260/29.2 TN |
| 4,277,380 | 7/1981 | Williams | 260/29.2 TN |

Primary Examiner—Paul R. Michl
Attorney, Agent, or Firm—Webb, Burden, Robinson & Webb

[57] ABSTRACT

An aqueous polyurethane composition capable of thermal coagulation is disclosed. The polyurethane composition is comprised of an aqueous polyurethane dispersion having anionic groups covalently bonded to the polymer chain and solubilized by the addition of a cationic compound which forms a salt with the anionic group. The composition also includes a compound which, when heated in an aqueous solution, generates acid which causes displacement of the cationic compound from the covalently bonded anionic groups.

A method of forming a composite sheet material is also disclosed. The composite sheet material is formed by impregnating a porous sheet material with the polyurethane composition and heating the impregnant to generate acid causing coagulation of the polyurethane dispersion in the porous sheet material. The impregnant is dried to form a composite sheet material.

14 Claims, No Drawings

THERMAL COAGULATION OF POLYURETHANE DISPERSIONS

BACKGROUND OF THE INVENTION

1. Field of the Invention

This invention relates to composite sheet material and more particularly, to a method of preparing a composite sheet material from a polyurethane polymer and porous sheet material.

2. Description of the Prior Art

Resin impregnated sheet materials such as cloth, batts, waterleaves and the like are well known in the art. These resin impregnated sheet materials are useful for a plurality of purposes including imitation leather in the form of vinyls and the like, structural sheet materials such as conveyor belts and similar products.

Prior art methods of impregnating a particular web involve the impregnation or coating of a porous material with a polymeric resin such as a polyurethane, vinyl or a similar material. Polyurethanes have met with wide acceptance as a coating or impregnating composition due to their capability of wide variation in chemical and physical properties, particularly their flexibility and chemical resistance. In impregnating the porous sheet material with a polymeric resin, several techniques have been employed. One such prior art method involves the use of the polymeric resin in an organic solvent system wherein the sheet material is dipped in the solution and the solvent is removed therefrom. These solvent systems are undesirable since the solvent, in many cases, is toxic and must either be recovered for reuse or discarded. These solvent systems are expensive and do not necessarily provide a desirable product since upon evaporation of the solvent from the impregnated porous sheet material, the resin tends to migrate to provide a non-homogeneous impregnation of the porous sheet material resulting in resin richness toward the surface of the sheet material rather than uniform impregnation.

In order to alleviate the problems with solvent systems, certain aqueous polymeric systems have been proposed. In forming impregnated sheet materials by impregnation with aqueous polymers the aqueous portion must be removed. Again heat is required and migration of the polymer to the surfaces of the impregnated sheet material is encountered.

In one method of combining polyurethane solutions with porous substrates the polymer is applied in an organic solvent to a substrate, such as a needle punched polyester batt. The polymer-substrate composite is subsequently bathed with a mixture of organic solvent for the polymer and a non-solvent for the polymer that is at least partially miscible with the solvent until the layer is coagulated into a cellular structure of interconnected micropores. The solvent is removed from the coating layer along with the non-solvent to produce a solvent free microporous layer. Although this process yields acceptable properties for a polyurethane impregnated fabric, it has the disadvantage of an organic solvent system particularly when high performance polyurethanes are utilized which require relatively toxic and high boiling solvents. An example of this method is disclosed in U.S. Pat. No. 3,208,875.

In another method polyurethane dispersions in organic vehicles have been proposed and used to coat porous substrates such as is disclosed in U.S. Pat. No. 3,100,721. In this system a solution is applied to a substrate and coagulated by further addition of a non-solvent for the polymer. Although this approach has been used with some success, it involves two major limitations: (1) the vehicle of the solution is substantially organic since relatively small amounts of non-solvent, preferably water, are needed to form a dispersion; and (2) there is a narrow useful range of added non-solvent so that reproducible results are difficult to obtain.

One particularly useful method of preparing composite sheet material by impregnating a porous substrate is disclosed in U.S. Pat. No. 4,171,391 incorporated herein by reference. In this system a porous sheet material is impregnated with an aqueous ionic dispersion of a polyurethane and the impregnant is coagulated therein. The composite is then dried to form a composite sheet material.

In one improvement over the method disclosed in U.S. Pat. No. 4,171,391, fibrous needled batts are fully impregnated with a polyurethane dispersion and coagulated by dipping the impregnant in an aqueous solution of acid such as acetic acid. This improved method is more fully disclosed in U.S. patent application Ser. Nos. 188,329 and 188,330, filed Sept. 18, 1980 by John McCartney, both incorporated herein by reference.

Although the prior art processes described in U.S. Pat. No. 4,171,391 and U.S. patent application Ser. Nos. 188,329 and 188,330 are successful in alleviating solvents in impregnating porous sheet materials with polyurethanes, a disadvantage in these processes arises in the coagulation step. The coagulation in these processes requires that the porous sheet material impregnated with polyurethane dispersion be contacted with an aqueous solution of a counterion. Thus, the impregnant must be washed free of the excess counterion prior to drying to form the composite sheet material. Further, these counterions can be supplied by low molecular weight organic acids such as acetic acid which can add an objectionable odor to the final product and also adds expense thereto. Further, in these prior art processes the coagulation rate is determined by the rate of diffusion of the coagulating agent, such as aqueous acid, into the saturated sheet material and subsequent diffusion of the products of coagulation in the washing step. In thicker felt products, such as 0.25 inch or greater, contact times as long as 30 minutes may be required to effect coagulation. Thus, it is desirable to reduce the time of coagulation.

In accordance with the present invention a process for forming a composite sheet material is provided which simplifies coagulation of polyurethane dispersions in porous sheet materials.

Further in accordance with the present invention, a polyurethane composition is provided which simplifies the coagulation of the polyurethane dispersion in the porous sheet material.

BRIEF DESCRIPTION OF THE INVENTION

An aqueous polyurethane composition is comprised of an aqueous anionic polyurethane dispersion having anionic groups covalently bonded to the polymer chain and solubilized by the addition of a cationic compound which forms a salt with the anionic group. The polyurethane composition also includes a compound which, when heated in an aqueous solution, generates acid which displaces the cationic compound from the covalently bonded anionic group.

A process for forming a composite sheet material involves impregnating at least a portion of porous sheet material with the aqueous anionic polyurethane composition and heating the impregnate to generate acid and coagulate the polyurethane dispersion in the porous sheet material. The impregnant is dried to form a composite sheet material.

DETAILED DESCRIPTION OF THE INVENTION

The polyurethanes useful in the practice of the present invention are those recognized in the art as ionically water dispersible. These dispersions are in contrast with the emulsified isocyanate copolymers such as those disclosed in U.S. Pat. No. 2,968,575 and prepared and dispersed in water with the aid of detergents under the action of powerful shearing forces. The emulsified polyurethanes have the disadvantage that a detergent must be used to form the emulsion and such detergent is usually retained in the dried emulsion coating, thus seriously detracting from the overall physical and chemical properties of the final product. Further, insufficient shearing force results in unstable products, and the material cannot usually be produced in conventional reaction kettles because of the need for a high shearing force.

The preferred system for preparing an ionic aqueous polyurethane dispersion is to prepare polymers that have free acid groups, preferably carboxylic acid groups covalently bonded to the polymer backbone. Neutralization of these carboxyl groups with an amine, preferably a water soluble mono-amine, affords water dilutability. Careful selection of the compound bearing the carboxylic group must be made because isocyanates, necessary components in any polyurethane system, are generally reactive with carboxylic groups. However, as disclosed in U.S. Pat. No. 3,412,054, incorporated herein by reference, 2,2-hydroxymethyl-substituted carboxylic acids can be reacted with organic polyisocyanates without significant reaction between the acid and isocyanate groups due to the stearic hinderance of the carboxyl by the adjacent alkyl groups. This approach provides the desired carboxyl containing polymer with the carboxylic groups being neutralized with the tertiary mono-amine to provide an internal quaternary ammonium salt and hence, water dilutability.

Suitable carboxylic acids and preferably the stearically hindered carboxylic acids, are well known and readily available. For example, they may be prepared from an aldehyde that contains at least two hydrogens in the alpha position which are reacted in the presence of a base with two equivalents of formaldehyde to form a 2,2-hydroxymethyl aldehyde. The aldehyde is then oxidized to the acid by procedures known to those skilled in the art. Such acids are represented by the structural formula,

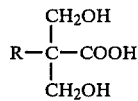

wherein R represents hydrogen or alkyl of up to 20 carbon atoms and preferably up to eight carbon atoms. A preferred acid is 2,2-di-(hydroxymethyl) propionic acid. The polymers with the pendent carboxyl groups are characterized as anionic polyurethane polymers.

The polyurethanes useful in the practice of the invention more particularly involve the reaction of di- or polyisocyanate and compounds with multiple reactive hydrogens suitable for the preparation of polyurethanes. Such diisocyanates and reactive hydrogen compounds are more fully disclosed in U.S. Pat. Nos. 3,412,034 and 4,046,729. Further, the process to prepare such polyurethanes is well recognized as exemplified by the aforementioned patents. In accordance with the present invention, aromatic, aliphatic and cycloaliphatic diisocyanates or mixtures thereof can be used in forming the polymer. Such diisocyanates, for example, are tolylene-2,4-diisocyanate; tolylene-2,6-diisocyanate; meta-phenylene diisocyanate; biphenylene-4,4'-diisocyanate; methylenebis(4-phenyl isocyanate); 4-chloro-1,3-phenylene diisocyanate; naphthylene-1,5-diisocyanate; tetramethylene-1,4-diisocyanate; hexamethylene-1,6-diisocyanate; decamethylene-1,10-diisocyanate; cyclohexylene-1,4-diisocyanate; methylenebis(4-cyclohexyl isocyanate); tetrahydronaphthylene diisocyanate; isophorone diisocyanate and the like. Preferably, the arylene and cycloaliphatic diisocyanates are used most advantageously in the practice of the invention.

Characteristically, the arylene diisocyanates encompass those in which the isocyanate group is attached to the aromatic ring. The most preferred isocyanates are the 2,4 and 2,6 isomers of tolylene diisocyanate and mixtures thereof, due to their ready availability and their reactivity. Further, the cycloaliphatic diisocyanates used most advantageously in the practice of the present invention are 4,4'-methylenebis(cyclohexyl isocyanate) and isophorone diisocyanate.

Selection of the aromatic or aliphatic diisocyanates is predicated upon the final end use of the particular material. As is well recognized by those skilled in the art, the aromatic isocyanates may be used where the final product is not excessively exposed to ultraviolet radiation which tends to yellow such polymeric compositions; whereas the aliphatic diisocyanates may be more advantageously used in exterior applications and have less tendency to yellow upon exposure to ultraviolet radiation. Although these principles form a general basis for the selection of the particular isocyanate to be used, the aromatic diisocyanates may be further stabilized by well known ultraviolet stabilizers to enhance the final properties of the polyurethane impregnated sheet material. In addition, antioxidants may be added in art recognized levels to improve the characteristics of the final product. Typical antioxidants are the thioethers and phenolic antioxidants such as 4,4'-butylidenebis-meta-cresol and 2,6-ditert-butyl-para-cresol.

The isocyanate is reacted with the multiple reactive hydrogen compounds such as diols, diamines, or triols. In the case of diols or triols, they are typically either polyalkylene ether or polyester polyols. A polyalkylene ether polyol is the preferred active hydrogen containing polymeric material for formulation of the polyurethane. The most useful polyglycols have a molecular weight of 50 to 10,000 and in the context of the present invention, the most preferred is from about 400 to 7,000. Further, the polyester polyols improve flexibility proportionally with the increase in their molecular weight.

Examples of the polyether polyols are, but not limited to, polyethylene ether glycol, polypropylene ether glycol, polytetramethylene ether gylcol, polyhexamethylene ether glycol, polyoctamethylene ether glycol, polydecamethylene ether glycol, polydodecamethylene ether glycol and mixtures thereof. Polyglycols containing several different radicals in the molecular chain, such as, for example, the compound HO(CH$_2$OC$_2$H$_4$O)$_n$H wherein n is an integer greater than one, can also be used.

The polyol may also be a hydroxy terminated or hydroxy pendent polyester which can be used instead or in combination with the polyalkylene ether glycols. Exemplary of such polyesters are those formed by reacting acids, esters or acid halides with glycols. Suitable glycols are polymethylene glycols such as ethylene, propylene, tetramethylene or decamethylene glycol; substituted methylene glycols such as 2,2-dimethyl-1,3-propane diol, cyclic glycols such as cyclohexanediol and aromatic glycols. Aliphatic glycols are generally preferred when flexibility is desired. These glycols are reacted with aliphatic, cycloaliphatic or aromatic dicarboxylic acids or lower alkyl esters or ester forming derivatives to produce relatively low molecular weight polymers, preferably having a melting point of less than about 70° C. and a molecular weight like those indicated for the polyalkylene ether glycols. Acids for preparing such polyesters are, for example, phthalic, maleic, succinic, adipic, suberic, sebacic, terephthalic and hexahydrophthalic acids and the alkyl and halogen substituted derivatives of these acids. In addition polycaprolactone terminated with hydroxyl groups may also be used.

One particularly useful polyurethane system is the crosslinked polyurethane system which is more fully disclosed in U.S. patent application Ser. No. 947,544, filed Oct. 2, 1978 of Andrea Russiello entitled "Crosslinked Polyurethane Dispersions" incorporated herein by reference.

The cationic compound useful in the practice of the invention is a base capable of forming a salt with the anionic group covalently bonded to the polymer chain. The cationic compounds are amines and preferably, water soluble amines such as triethyl amine, tripropyl amine, N-ethyl piperidine and the like.

If the final composite sheet material is to be flexible, the polyurethane polymer must behave in an elastomeric manner. The desired elastomeric behavior would generally require about 25 to 80 percent by weight of a long chain polyol (i.e., 700 to 2,000 eq. wt.) in the polymer. The degree of elongation and elasticity may vary widely from product to product depending upon the desired properties of the final product.

In forming the polyurethanes useful in the practice of the invention, the polyol and a molar excess of diisocyanate are reacted to form isocyanate terminated polymer. Although suitable reaction conditions and reaction times and temperatures are variable within the context of the particular isocyanate and polyol utilized, those skilled in the art well recognize these variations. Such skilled artisans recognize that reactivity of the ingredients involved requires the balance of reaction rate with undesirable secondary reactions leading to color and molecular weight degradation. Typically, the reaction is carried out with stirring at about 50° C. to about 120° C. for about one to four hours. To provide pendent carboxyl groups the isocyanate terminated polymer is reacted with a molar deficiency of dihydroxy acid for one to four hours at 50° C. to 120° C. to form isocyanate terminated prepolymer. The acid is desirably added as a solution, for example, in N-methyl-1,2-pyrrolidone or N-N-dimethylformamide. The solvent for the acid will typically be no more than about 5% of the total charge in order to minimize the organic solvent concentration in the polyurethane composition. After the dihydroxy acid is reacted into the polymer chain, the pendent carboxyl groups are neutralized with an amine at about 58° C. to 75° C. for about twenty minutes and chain extension and dispersion are accomplished by addition to water with stirring. A water soluble diamine may be added to the water as an additional chain extender. The chain extension involves the reaction of the remaining isocyanate groups with water to form urea groups and further polymerize the polymeric material with the result that all the isocyanate groups are reacted by virtue of the addition to a large stoichiometric excess of water. It is to be noted that the polyurethanes of the invention are thermoplastic in nature, i.e., not capable of extensive further curing after formation except by the addition of an external curing agent. Preferably, no such curing agent is added to form the composite sheet material.

Sufficient water is used to disperse the polyurethane at a concentration of about 10 to 40 percent by weight solids and a dispersion viscosity in the range of 10 to 1,000 centipoise. Viscosity may be adjusted in accordance with the particular impregnation properties desired and by the particular dispersion composition which are all dictated by the final product characteristics. It should be noted that no emulsifiers or thickeners are required for the stability of the dispersions.

Those of ordinary skill in the art recognize ways to modify the primary polyurethane dispersions according to end product uses, for example, by the addition of coloring agents, compatible vinyl polymer dispersions, ultraviolet filtering compounds, stabilizers against oxidation, and by blending polyurethane dispersions of different compositions.

The characterization of the dispersions prepared in accordance with the invention is done by measurements of non-volatile content, particle size, viscosity measurements and by stress strain properties on strips of cast film.

The concentration range useful in the practice of the invention is governed by the desirable percent add on of polymer into the porous sheet material.

The dispersion viscosity is generally in the range from 10 to 1,000 centipoise. The low viscosity, relative to that of identical polymers at the same solids level in organic solvent polymer solutions, assists rapid and complete penetration of the aqueous dispersion. Useful solutions of polyurethanes will, in contrast, generally have viscosities of several thousand centipoise ranging as high as 50,000 centipoise at concentrations of 20 to 30%.

Particle size, as a useful measure of stability, may be measured by light scattering. Useful dispersions having non-settling characteristics will have particles of a diameter of less than 1 micron.

Porous substrates useful in the practice of the invention include woven and knit fabrics, felts, and nonwovens, such as spun-bonded sheets, needled batts, and waterleaves. Suitable substrate fibers are the natural fibers, particularly cotton (all-cotton and cotton blends with synthetics such as polyester and nylon), and less desirably wool synthetic fibers such as polyester, nylon, acrylics, modacrylics, and rayons. The fibers may be straight or crimped, continuous filament or staple, or of papermaking length. Naturally, choice of fiber, type of substrate and its construction, and weight/unit area will be made on the basis of cost, end-use requirements, and other considerations commonly recognized in the textile and coated fabric industries, but only contingent on the particular end use for the composite.

In the process of the invention the substrate may be impregnated with polyurethane from about 5% to about 80% of the total composite weight, preferably in the range of 15 to 80%. Thus, the properties of the substrate porous sheet will strongly affect the properties of the composite fabric. Property measurements pertinent to shoe and upholstery uses on the finished sheets include tensile strength, tear strength, and bias elongation.

Because the substrate is porous, the aqueous polyurethane dispersion permeates the pores of the substrate at a rate controlled by the viscosity of the aqueous system and the hydrophilic characteristics of the particular substrate used. Thus, any of the methods used in the coated fabric industry as previously discussed are suitable for impregnating the porous substrate with the aqueous dispersion.

The polyurethane composition useful in the practice of the invention is prepared by admixing the aqueous polyurethane dispersion with the compound which, when heated in an aqueous solution, generates acid which displaces the cationic compound from the covalently bonded anionic group.

The compounds which, when heated, generate acid are preferably salts of hydrofluorosilicic acid. Exemplary of such salts are, but not limited to, lithium silicofluoride; sodium silicofluoride; potassium silicofluoride; ammonium silicofluoride; rubidium silicofluoride; caesium silicofluoride; magnesium silicofluoride; calcium silicofluoride; barium silicofluoride; cupric silicofluoride and manganous silicofluoride. Preferably, either potassium silicofluoride or sodium silicofluoride is used and more preferably sodium silicofluoride.

In a preferred method of preparing the polyurethane composition, the sodium or potassium silicofluoride salt is masterbatched with 0.02 to 0.2 normal aqueous alkali metal hydroxide (either sodium or potassium hydroxide corresponding to the respective silicofluoride) and a dispersion stabilizer such as clay or the like. To assist the dissolution of the sodium silicofluoride, it is ball milled to about 400 mesh with the aqueous alkali metal hydroxide. The polyurethane dispersion is buffered to stabilize the pH thereof to insure stability of the dispersion at room temperature subsequent to the addition of silicofluoride. Borax has been found to be an effective buffer in this regard and stabilizes the dispersion at a pH of about 8.5 in the range of 0.1 to 0.2 molar based upon the polyurethane composition. It is desirable that the pH dispersion be controlled at about 7 to 9. After the dispersion is stabilized with the buffer, a portion of the silicofluoride masterbatch is added in an amount sufficient to provide a stoichiometric excess of silicofluoride anion which causes displacement of the cationic compound from the covalently bonded anionic group.

The porous sheet material is then impregnated with the polyurethane composition at room temperature (i.e. about 20° C.). Although decomposition of the silicofluoride in the polyurethane composition occurs at 20° C., long term stability, i.e. weeks, can be achieved by controlling pH and ionic species in the polyurethane composition. Methods of effecting stabilization are known to those skilled in the art of using aqueous silicofluoride systems. Some of these systems are more fully disclosed in *Fluorine Chemistry*, J. H. Simons pages 126-182, Academic Press 1950; and *Chemical & Engineering News*, Vol. 27, 2420 CA, Hampel (1949). Subsequent to impregnation the impregnant is heated to greater than 40° C. and preferably greater than 65° C. which causes the generation of silicofluoride anion which causes displacement of the cation from the bonded anionic group effecting coagulation of the polyurethane from the dispersion into the porous substrate. The coagulation is instantaneous and is dependent on the heat transfer through the impregnant. The heating can be conducted by contacting the impregnant with water which is heated to the desired temperature, by heating the impregnant in an oven, or by treating the impregnant with microwaves to raise the temperature thereof. When the impregnant is contacted with heated water, the water may contain a minor amount (less than 1%) of a non-volatile mineral acid such as sulfuric and/or phosphoric acid to immediately coagulate the surface of the impregnant to eliminate any loss of polymer. One additional advantage of using heated water is that it also provides a necessary washing step in the process.

After coagulation, the impregnant is squeezed to remove water, and washed again with water if desired. The impregnant is then dried to form the composite sheet material.

The following example is illustrative of the invention.

EXAMPLE 50 parts by weight of sodium silicofluoride were ball milled with 50 parts by weight of 0.1 N NaOH and 1% bentonite clay to about 400 mesh to form a sodium silicofluoride dispersion.

100 parts by weight of the aqueous anionic polyurethane dispersion prepared in accordance with Example III of U.S. patent application Ser. No. 947,544 of Andrea Russiello previously cited herein at 22% total solids was admixed with borax to provide a stabilized dispersion of 0.02 molar $Na_2B_4O_7.10H_2O$ at a pH of 8.5. 3.5 parts by weight of silicofluoride masterbatch was added to the stabilized dispersion to provide a threefold stoichiometric excess of silicofluoride based upon the anionic groups covalently bonded to the polymer chain. The above polyurethane composition was prepared at room temperature and was stable at room temperature for 72 hours prior to its use for impregnation.

A needled batt which was heat set and had a density of 1,200 grams/sq. meter composed of polyester, polypropylene and rayon fibers and a thickness of 0.3 inches with a bulk density of 0.16 grams/cm$^3$ was immersed in the above polyurethane composition. Because the polymeric dispersion had a 22% total solids content, it provided an add on of 120% polyurethane based upon the weight of the batt. The batt, on a continuous basis, was immersed in the polyurethane composition at room temperature until all of the air was expelled from within the batt and the batt was fully impregnated. The surface of the batt was wiped with a straight edge on both sides to remove excess polyurethane composition. The impregnant was, on a continuous basis, immersed in a water bath at 70° C. for one minute. The water bath had 0.5% $H_3PO_4$. Immersion in the water bath completely coagulated the polyurethane within the fiber structure. The impregnated batt was squeezed between nip rolls to eliminate water, washed with clear water and squeezed again. The resin impregnated batt was split into four slices through its thickness and each split was dried at 300° to 350° F. in a circulating air oven to form four resin impregnated webs having a bulk density of 0.41 grams/cc. The product produced in accordance with this Example was comparable to the product produced in accordance with Example I of U.S. patent application Ser. No. 188,329 previously cited herein.

In accordance with the present invention, a substantial reduction in coagulation time is effected by using the high diffusion rate of heat through the impregnant to coagulate the polyurethane composition.

Although the invention has been described with reference to particular materials and particular processes, the invention is only to be limited so far as is set forth in the accompanying claims.

I claim:

1. An aqueous polyurethane composition capable of coagulation by the application of heat thereto comprising:
   an aqueous anionic polyurethane dispersion having anionic groups covalently bonded to the polymer chain and solubilized by the addition of a cationic compound which forms a salt with the anionic group; and
   a compound which, when heated in an aqueous solution, generates acid which displaces the cationic compound from the covalently bonded anionic group.

2. The polyurethane composition of claim 1 wherein said polyurethane dispersion has a solids content of 5 to 50 percent by weight.

3. The polyurethane composition of claim 2 wherein said polyurethane dispersion has a solids content of 10 to 40 percent by weight.

4. The polyurethane composition of claim 1 wherein said polyurethane dispersion has a viscosity of 10 to 5,000 centipoise.

5. The polyurethane composition of claim 4 wherein said polyurethane dispersion has a viscosity of 10 to 5,000 centipoise.

6. The polyurethane composition of claim 1 wherein said polyurethane dispersion is a crosslinked polyurethane dispersion.

7. The polyurethane composition of claim 1 wherein the compound which, when heated, generates acid is a salt of hydrofluorosilicic acid.

8. The polyurethane composition of claim 7 wherein said salt of hydrofluorosilicic acid is selected from the group consisting of sodium silicofluoride and potassium silicofluoride.

9. The polyurethane composition of claim 1 wherein said compound which, when heated, generates acid is present at a level wherein there is a stoichiometric excess of acid based upon the anionic covalently bonded groups.

10. The polyurethane composition of claim 1 including a buffer to maintain the pH of said polyurethane dispersion at 7 to 9.

11. The polyurethane composition of claim 10 wherein said buffer maintains the pH of said polyurethane dispersion at about 8.5.

12. The polyurethane composition of claim 10 wherein said buffer is borax.

13. The polyurethane composition of claim 1 including an alkali hydroxide.

14. A polyurethane composition comprising an aqueous anionic polyurethane having anionic groups covalently bonded to the polymer chain and solubilized by the addition of a cationic compound which forms a salt with the anionic group; and a sufficient amount of borax to stabilize the pH of the polyurethane dispersion.

* * * * *